United States Patent
Han et al.

(10) Patent No.: US 10,705,971 B2
(45) Date of Patent: Jul. 7, 2020

(54) MAPPING LOGICAL BLOCKS OF A LOGICAL STORAGE EXTENT TO A REPLACEMENT STORAGE DEVICE

(71) Applicant: EMC IP Holding Company LLC, Hopkinton, MA (US)

(72) Inventors: Geng Han, Beijing (CN); Wayne Weihua Li, Beijing (CN); Jian Gao, Beijing (CN); Jamin Kang, Beijing (CN); Shaoqin Gong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 168 days.

(21) Appl. No.: 15/954,691

(22) Filed: Apr. 17, 2018

(65) Prior Publication Data

US 2018/0300252 A1    Oct. 18, 2018

(30) Foreign Application Priority Data

Apr. 17, 2017    (CN) .......................... 2017 1 0249936

(51) Int. Cl.
| | | |
|---|---|---|
| *G06F 11/00* | (2006.01) | |
| *G06F 12/10* | (2016.01) | |
| *G06F 11/20* | (2006.01) | |
| *G06F 12/02* | (2006.01) | |

(52) U.S. Cl.
CPC .......... *G06F 12/10* (2013.01); *G06F 11/2094* (2013.01); *G06F 12/0246* (2013.01); *G06F 2201/82* (2013.01); *G06F 2212/1041* (2013.01); *G06F 2212/657* (2013.01); *G06F 2212/7201* (2013.01)

(58) Field of Classification Search
CPC ............ G06F 11/1008; G06F 11/1076; G06F 11/2056
See application file for complete search history.

(56) References Cited

U.S. PATENT DOCUMENTS

| | | | | |
|---|---|---|---|---|
| 7,603,529 | B1* | 10/2009 | MacHardy | G06F 3/0608 707/999.202 |
| 8,407,265 | B1* | 3/2013 | Scheer | G06F 16/1727 707/823 |
| 8,583,893 | B2* | 11/2013 | Pruthi | G06F 3/0611 711/136 |
| 9,417,955 | B2* | 8/2016 | Patterson | G06F 11/1076 |
| 9,641,615 | B1* | 5/2017 | Robins | H04L 67/1097 |
| 10,013,311 | B2* | 7/2018 | Sundaram | G06F 3/0653 |
| 10,073,621 | B1* | 9/2018 | Foley | G06F 11/1076 |
| 2003/0023811 | A1* | 1/2003 | Kim | G06F 3/0601 711/114 |
| 2010/0017650 | A1* | 1/2010 | Chin | G06F 11/108 714/6.12 |
| 2013/0227345 | A1* | 8/2013 | Gadekar | G06F 11/1092 714/6.22 |

(Continued)

*Primary Examiner* — Elmira Mehrmanesh
(74) *Attorney, Agent, or Firm* — BainwoodHuang (57) ABSTRACT

Embodiments of the present disclosure relate to a method, a device and a computer readable medium for managing a storage system. The method can determine a mapping between a logical storage extent and a plurality of storage devices in a storage pool without storing a table of the mapping. Further, the method can record a new mapping after a storage devices fails and restore the original mapping after the failed storage device is replaced.

18 Claims, 7 Drawing Sheets

(56) References Cited

U.S. PATENT DOCUMENTS

| | | | |
|---|---|---|---|
| 2014/0258595 A1* | 9/2014 | Venkatesha | G06F 9/5016 |
| | | | 711/103 |
| 2016/0057224 A1* | 2/2016 | Ori | G06F 3/06 |
| | | | 709/213 |
| 2016/0170833 A1* | 6/2016 | Segura | G06F 11/1088 |
| | | | 714/6.23 |
| 2017/0212705 A1* | 7/2017 | Kidney | G06F 3/0631 |

* cited by examiner

MAPPING LOGICAL BLOCKS OF A LOGICAL STORAGE EXTENT TO A REPLACEMENT STORAGE DEVICE

RELATED APPLICATIONS

This application claim priority from Chinese Patent Application Number CN201710249936.1, filed on Apr. 17, 2017 at the State Intellectual Property Office, China, titled "METHOD, DEVICE AND COMPUTER-READABLE MEDIUM FOR STORE MANAGE" the contents of which is herein incorporated by reference in its entirety.

FIELD

Embodiments of the present disclosure generally relate to storage management, and more specifically, to a method and device for storage management.

BACKGROUND

Redundant array of independent disks (RAID) is a data storage virtualization technology that combines a plurality of physical disk drives into a single logical unit for the purpose of improving data redundancy, reliability and performance. Depending on the desired level of redundancy and performance, data is distributed across a plurality of physical disk drives with one of multiple RAID levels, for instance, RAID 0-RAID 50. Taking the conventional RAID 5 as an example, the RAID 5 consists of block-level striping with distributed parity check. Information of parity check is distributed among a plurality of physical disk drives. When a single physical disk drive damages, data that is read subsequently can be calculated based on the distributed parity check (such as through Exclusive OR (XOR) operation) such that no data is lost. At the same time, one hot spare physical disk drive can be selected to replace the damaged physical disk drive. All the data on the damaged physical disk drive will be rebuilt and written into the selected hot spare physical disk drive.

However, as rebuilding time of the traditional RAID technology is limited by the writing input/output bandwidth of the hot spare physical disk drive, writing input/output bandwidth of the hot spare physical disk drive has become a bottleneck for the traditional RAID technology, making it difficult for the traditional RAID technology to reduce the rebuilding time. Therefore, a mapped RAID technology is generated.

SUMMARY

Embodiments of the present disclosure provide a method, a device and a corresponding computer program product for storage management.

According to a first aspect of the present disclosure, there is provided a method of storage management. The method comprises: in response to a logical storage extent being to be distributed to a plurality of storage devices in a storage pool, dynamically determining a first mapping between the logical storage extent and the plurality of storage devices; and distributing a plurality of logical blocks of logical storage extent to storage blocks of the plurality of storage devices, based on the first mapping.

According to a second aspect of the present disclosure, there is provided an electronic device. The device comprising: at least one processor; and a memory coupled to the at least one processor, the memory having instructions stored therein which, when executed by the at least one processor, cause the electronic device to perform acts. The acts comprises: in response to a logical storage extent being to be distributed to a plurality of storage devices in a storage pool, dynamically determining a first mapping between the logical storage extents and the plurality of storage devices; and distributing a plurality of logical blocks of the logical storage extent to storage blocks of the plurality of storage devices, based on the first mapping.

According to a third aspect of the present disclosure, there is provided a computer-readable medium storing instructions thereon which, when executed by at least one processing unit, cause the at least one processing unit to perform a method. The method comprises: in response to a logical storage extent being to be distributed to a plurality of storage devices in a storage pool, dynamically determining a first mapping between the logical storage extent and the plurality of storage devices; and distributing a plurality of logical blocks of logical storage extent to storage blocks of the plurality of storage devices, based on the first mapping.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description to the example embodiments of the present disclosure with reference to the accompanying drawings, the above and other objectives, features, and advantages of the present disclosure will become more apparent. In the example embodiments of the present disclosure, the same reference signs generally represent the same components.

DETAILED DESCRIPTION OF EMBODIMENTS

Example embodiments of the present disclosure will be described in the following text in greater detail with reference to the drawings. Although example embodiments of the present disclosure are displayed in the drawings, it is to be understood that the present disclosure can be implemented in various manners, not limited to embodiments illustrated herein. On the contrary, these embodiments are provided to make the present disclosure more thorough and complete, and convey the scope of the present disclosure completely to those skilled in the art.

As used herein, the term "include" and its variants are to be read as open-ended terms that mean "include, but are not limited to." The term "or" is to be read as "and/or" unless the context clearly states otherwise. The term "based on" is to be read as "based at least in part on." The term "one example embodiment" and "an example embodiment" are to be read as "at least one example embodiment." The term "another embodiment" is to be read as "at least one another embodiment." Terms "a first", "a second" and others can represent different or identical objects. The following text may also contain other explicit or implicit definitions.

Figure 1:
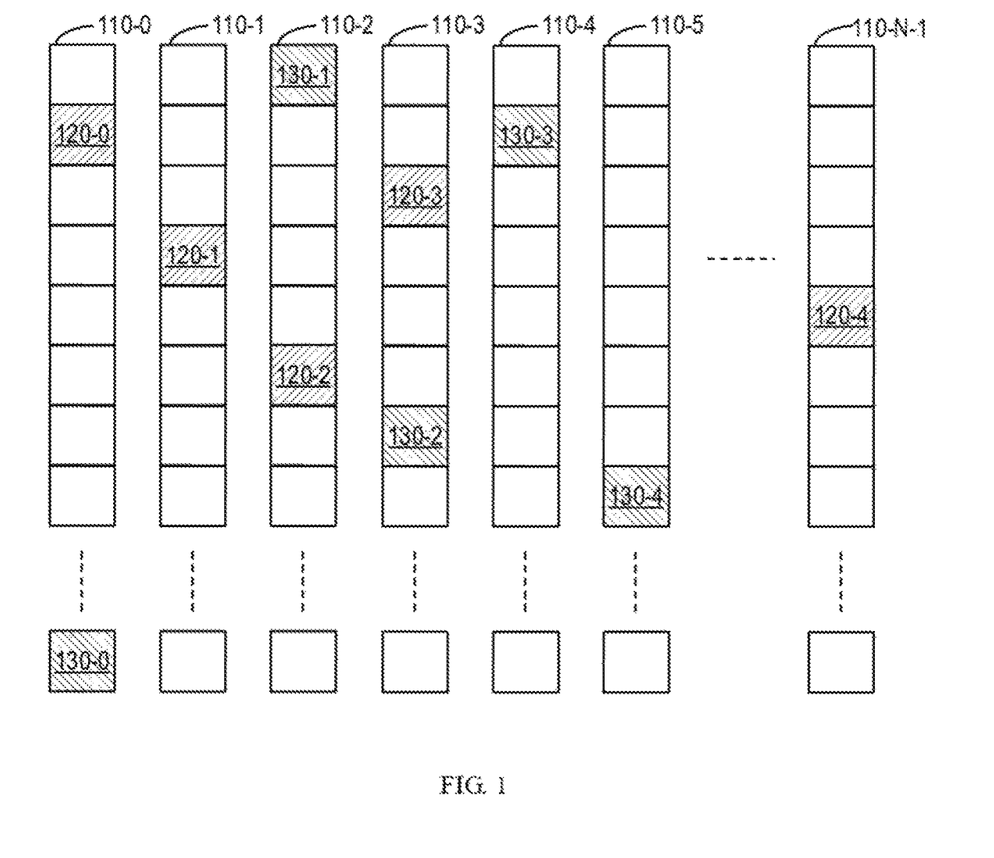
FIG. 1 is a schematic diagram illustrating an example for creating logical storage extents on a plurality of storage devices in a storage pool.

FIG. 1 is a schematic diagram illustrating an example for creating logical storage extents on a plurality of storage devices in a storage system. The storage system can utilize mapped RAID to reduce the rebuilding time. The mapped RAID can be created in a storage device pool which is composed of a plurality of storage devices that can be viewed as a set of continuous, non-overlapping storage blocks generally having a fixed size or capacity. Examples of storage devices include, but are not limited to, physical disk drives. An example for creating logical storage extents on a plurality of storage devices in a mapped RAID will be described below with 4D+1P RAID 5 as an example.

FIG. 1 illustrates N storage devices 110-0 to 110-N–1 (collectively referred to as storage device 110 hereinafter), where N is a natural number larger than 5. The logical storage extents can be created on the N storage devices, and organized into 5 blocks which includes four data blocks and 1 parity block. Five blocks from five different storage devices can be selected from the N storage devices 110 to create a logical storage extent. FIG. 1 illustrates logical storage extents 120 and 130. The logical storage extent 120 is organized as blocks 120-0 to 120-4, where the blocks 120-0 to 120-3 are data blocks and the block 120-4 is a parity check block. The logical storage extent 130 is organized as blocks 130-0 to 130-4, where the blocks 130-0 to 130-3 are data blocks while 130-4 is a parity check block. Besides, different from the traditional RAID technology which reserves a whole storage device as a hot spare storage device, mapped RAID reserves blocks in the storage device as hot spare blocks.

Figure 2:
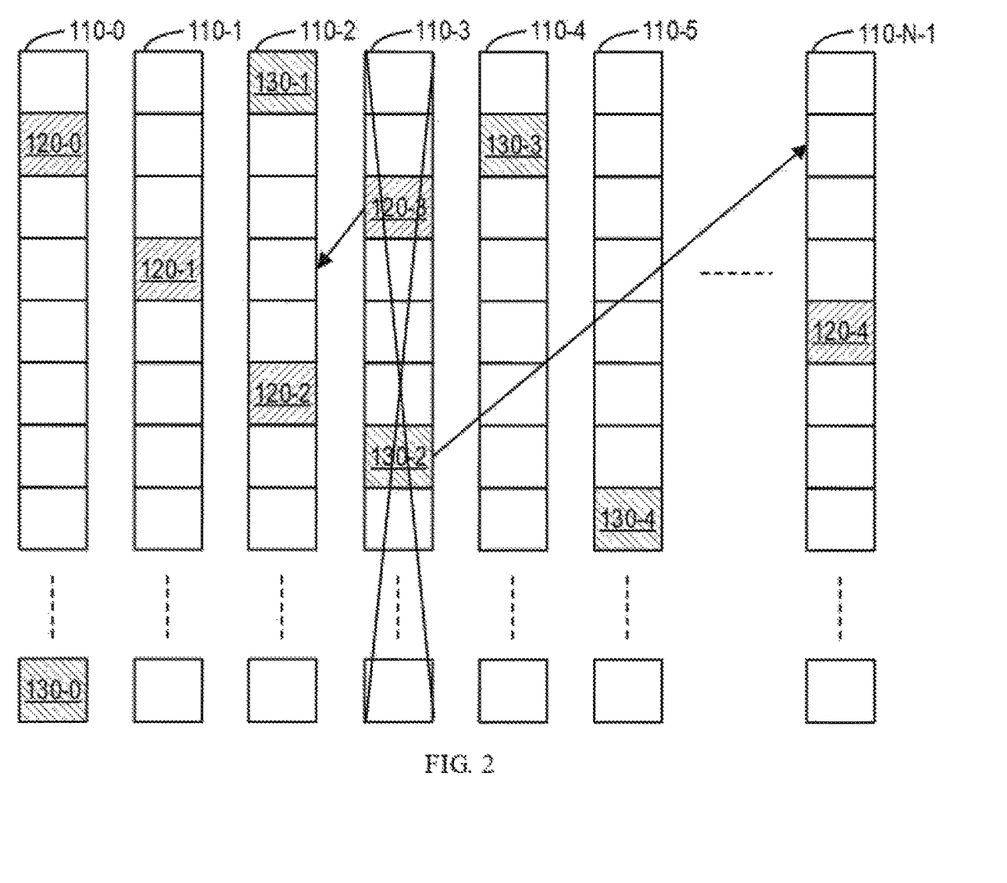
FIG. 2 is a schematic diagram illustrating an example for replacing a storage device when the storage device in the storage pool fails.

FIG. 2 is a schematic diagram of replacing a storage device with hot spare blocks when a storage device in a storage system fails. When one storage device in the storage system has a failure, blocks in the other live storage devices can be used to replace blocks in the faulty storage device. As shown in FIG. 2, when the storage device 110-3 has a failure, spare blocks in storage devices 110-2 and 110-N can be used to replace the block 120-3 in the logical storage extent 120 and the block 130-2 in the logical storage extent 130. Since blocks from different storage devices are utilized to replace blocks in the faulty storage device, mapped RAID will not be restricted to write input/output bandwidth of a single storage device.

Generally, a mapping table is used to record address mapping relations between the logical storage extent and the storage device in the mapped RAID. The mapping table records storage devices that the RAID logical storage extents are distributed to and blocks on the storage device. For example, DEX-Y can be used to represent a specific physical address of a storage block, where X represents a serial number of the storage device and Y represents a serial number of blocks on the storage device. However, storage of the mapping table would cause large memory consumption.

Besides, with blocks on the storage device becoming smaller and capacity of the storage device increasing, memory consumption is getting larger and larger, which does not only increase hardware overhead but also add software complexity.

To solve the above and other potential problems and defects at least in part, embodiments of the present disclosure provide a solution for storage management.

According to embodiments of the present disclosure, when it is not necessary to store mapping tables in the memory, the mapping relation of the mapped RAID can be maintained, thereby reducing memory consumption significantly. Furthermore, when the storage device fails, only the mapping relation of changed mapped RAID is stored. Besides, when the faulty storage device is replaced, the initial mapping relation is restored, and storage space storing the changed mapping relation is released, thereby saving the storage space.

It shall be appreciated that for clearer illustration, rather than for limiting purpose, embodiments of the present disclosure only expound on the condition of building mapped RAIDS on 16 storage devices, namely, there are 16 logical storage extents, each having 4 data logical blocks and one check logical block.

Figure 3:
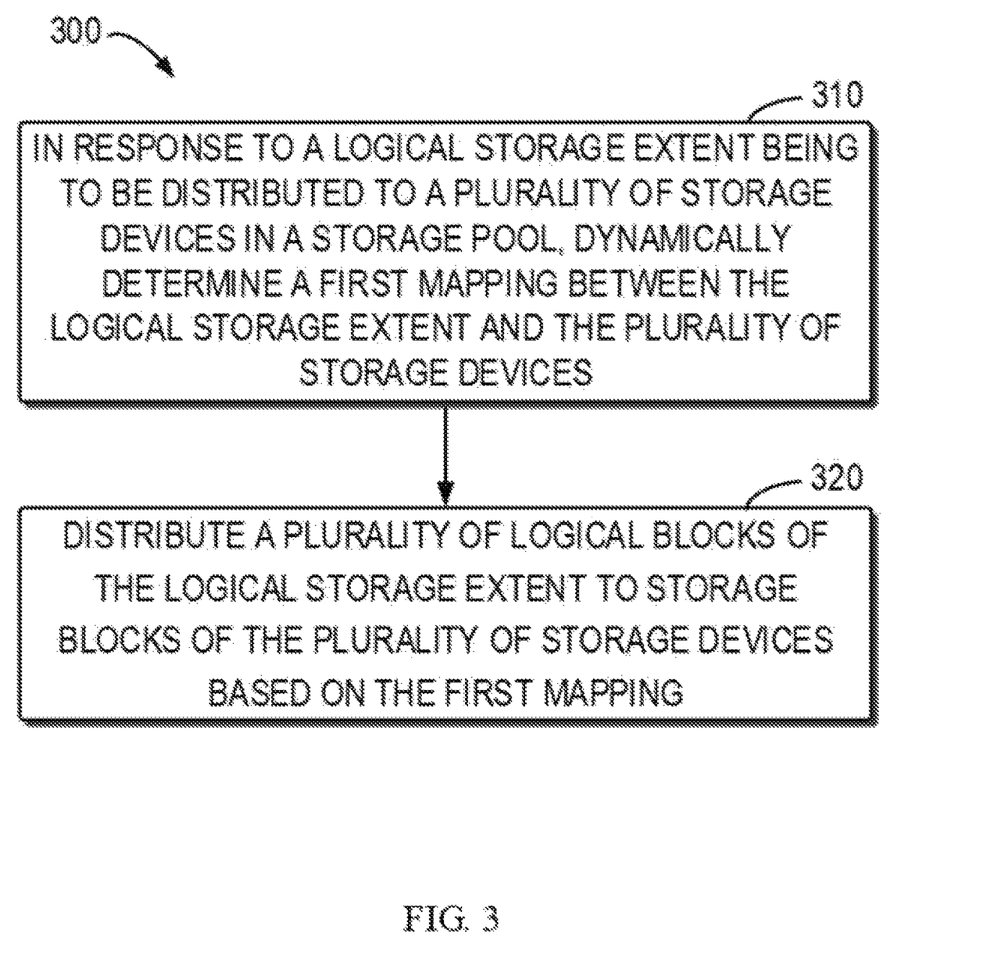
FIG. 3 is a flowchart of a process or method for storage management according to embodiments of the present disclosure.

FIG. 3 is a flowchart of a process or method 300 of storage management according to embodiments of the present disclosure. In some embodiments, process 300, for instance, can be implemented in the storage system shown in FIGS. 1 and 2.

At 310, in response to a logical storage extent being to be distributed to a plurality of storage devices 110 in the storage pool, a first mapping between the logical storage extent and the plurality of storage devices 110 is determined dynamically. It is not necessary to store the determined first mapping. In some embodiments, hash function can be utilized to determine the first mapping. By way of example, at 310, the first mapping relation between the logical storage extent -i and the storage devices 110 can be determined by the equation shown in Table 1.

TABLE 1

| | |
|---|---|
| $X_n = (i * 5 + n)\%16$ | (1) |
| $Y_n = (i * 5 + n)/16$ | (2) | where X represents a serial number of the storage devices (namely, storage devices 110-X, X=0, 1, 2, . . . , 15), Y represents a serial number of blocks in the storage devices (namely, the storage block -Y in the storage devices 110-X), i stands for a serial number of the logical storage extent (namely, logical storage extents -i, i=0, 1, 2, . . . , 15), and n represents a serial number of logical blocks in the logical storage extent (namely, logical block -n in the logical storage extent -i, n=0, 1, 2, 3, 4).

Only as an example, at 310, in response to the logical storage extent -0 to be distributed to a plurality of storage devices 110, the first mapping relation between the logical storage extent -0 and the plurality of storage devices 110 can be determined with equations (1) and (2). It is to be understood that the above DEX-Y can be used to represent the specific physical address of the storage block. In this example, the determined first mapping relation is: [DE: 00-000, DE: 01-000, DE: 02-000, DE: 03-000, DE: 04-000].

In some embodiments, the mapping relation between the plurality of storage extents and the plurality of storage devices 110 should be determined separately, and the mapping relation between each storage extent and the plurality of memories 110 can be determined based on the same method. Only as an example, the mapping relation between the logic extent -0, logic extent -1, . . . , logic extent -15 and the plurality of storage devices 110 can be determined with equations (1) and (2).

At 320, according to the first mapping, a plurality of storage blocks in the logical storage extent are distributed to storage blocks of a plurality of storage devices.

Only as an example, according to the first mapping relation determined at 310, the logical block -0 in the logical storage extent -0 is distributed to the storage block -0 of the storage device 110-0, the logical block -1 in the logical storage extent -0 is distributed to storage block -0 of the storage device 110-1, the logical block -2 in logical storage extent -0 is distributed to the storage block -0 of the storage device 110-2, the logical block -3 in the logical storage extent -0 is distributed to the storage block -0 of the storage device 110-3, and the logical block -4 in logical storage extent -0 is distributed to the storage block -0 of the storage device 110-4. It is to be understood that the mapping relation between the above logical blocks of the logic extent and the storage blocks of the storage device 110 is only illustrative.

In some embodiments, a serial number of a next available storage block in a single storage device and a serial number of a next available storage device are stored. Only as an example, in the above illustration, the next available storage device is storage device -0 and the next available storage block in each storage device is the $5^{th}$ storage block.

Figure 4:
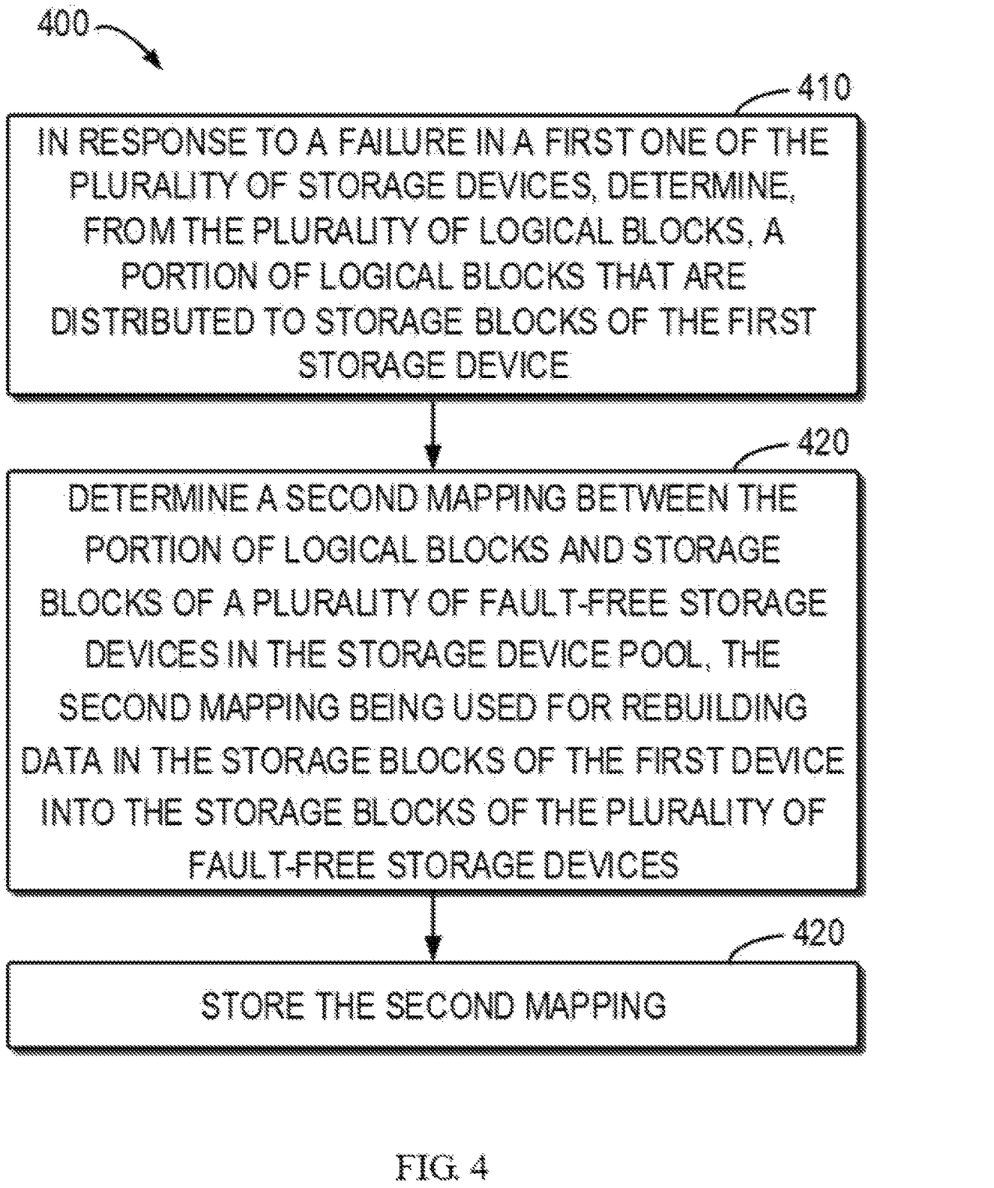
FIG. 4 is a flowchart of a process or method for selecting a hot spare disk according to embodiments of the present disclosure.

In some embodiments, after the storage management method 300 shown in FIG. 3 is performed, a hot spare disk can be selected based on the process or method 400 shown in FIG. 4.

At 410, in response to a failure in a first storage device in a plurality of storage devices 110, a portion of logical blocks which are distributed to storage blocks of the first storage device in a plurality of logical blocks are determined. In some embodiments, hash function can be used to determine logical blocks of the plurality of logical blocks distributed to storage block in the first storage. Only as an example, if the first mapping between logical storage extent and a plurality of storage devices is determined with equations (1) and (2), after one of the plurality of storage devices has a failure, equation (3) shown in Table 2 can be used to determine logical blocks distributed to the faulty storage device.

TABLE 2

$$i = (Y * 16 + X)/5 \quad (3)$$

where X represents a serial number of the storage devices (namely, storage devices 110-X, X=0, 1, 2, . . . , 15), Y represents a serial number of blocks in the storage devices (namely, storage block -Y in the storage device -X), i stands for a serial number of the logical storage extent (namely, logical storage extents -i, i=0, 1, 2, . . . , 15), and n represents a serial number of logical blocks of the logical storage extent (namely, logical block -n in the logical storage extent -i, n=0, 1, 2, 3, 4).

Only as an example, at 410, in response to a failure in the storage device 110-2, logical blocks distributed to the storage device 110-2 can be determined. That is, X=2, Y is assigned with 0, 1, 2, 3, 4 successively. The value of i can be obtained with equation (3) as 0, 3, 6, 10 and 13. Thus, it can be determined that the logical block -2 in the logical extent -0, the logical block -3 in the logical extent -3, the logical block 4 in the logical extent -6, the logical block 0 in the logical extent -10 and the logical extent -1 in the logical extent 13 are affected, and need to be redistributed to the hot spare disks.

At 420, a second mapping can be determined based on the determined portion of logical blocks and a plurality of fault-free storage devices in the storage device pool, and the second mapping is used to rebuild data in storage blocks of the first device into the plurality of storage devices without failure. In some embodiments, the second mapping can be determined based on the serial number of the stored next available storage device. In some embodiments, storage blocks that the logical blocks are distributed to and storage blocks which other logical blocks in the logical extent that the logical blocks are located in are distributed to come from different storage devices. In some embodiments, a portion of logical blocks are distributed to storage blocks of different fault-free storage devices among a plurality of fault-free storage devices.

Only as an example, the above affected logical blocks, namely, the logical block -2 in the logical extent -0, the logical block -3 in the logical extent -3, the logical block 4 in the logical extent -6, the logical block 0 in the logical extent -10 and the logical extent -1 in the logical extent 13 are distributed to storage blocks DE05-005, DE06-005, DE07-005, DE08-005, DE09-005, namely, data in the storage blocks DE02-000, DE02-001, DE02-002, DE02-003, DE02-004 are rebuilt into the storage blocks DE05-005, DE06-005, DE07-005, DE08-005 and DE09-005, respectively.

In some embodiments, when second mapping is determined, information of the serial number of the next available storage device can be updated. It shall be appreciated that any suitable method can be used to update information of the serial number of the next available storage device.

At 430, the second mapping is stored.

Figure 5:
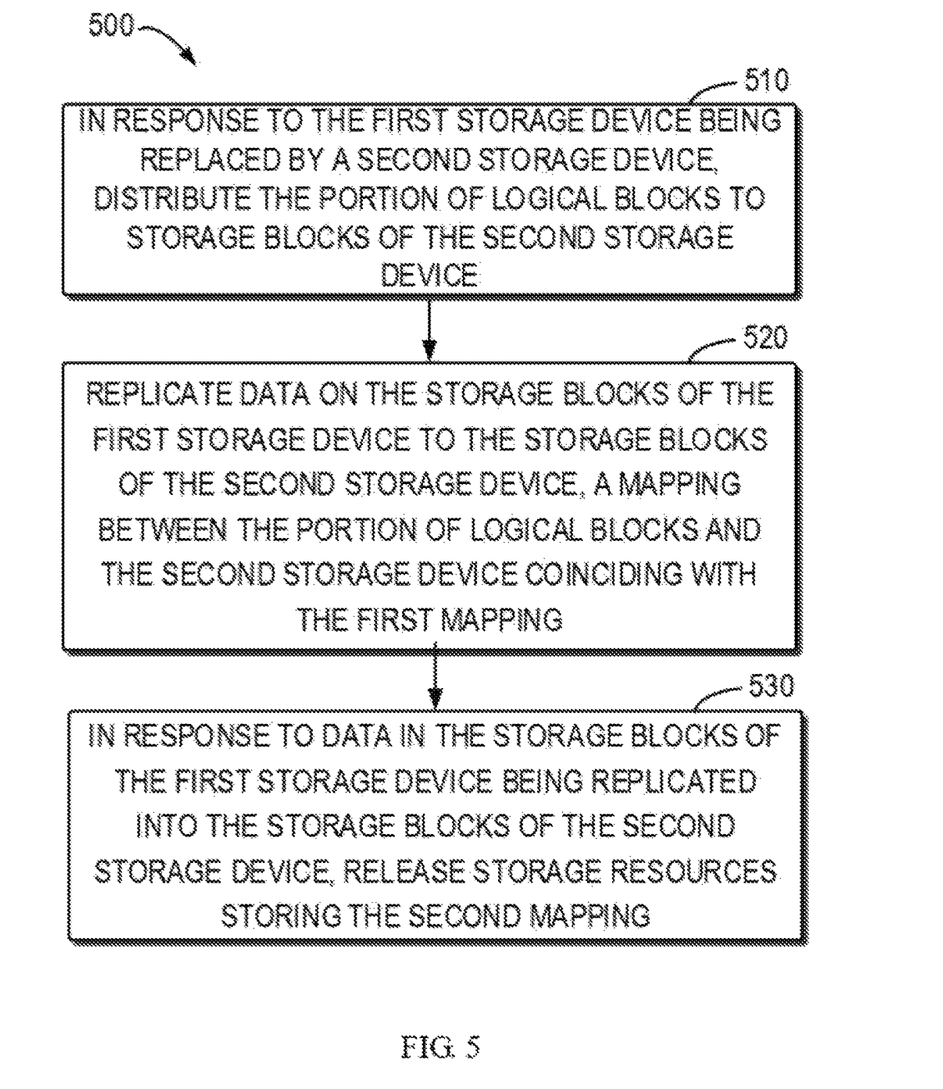
FIG. 5 is a flowchart of a process or method for replacing a device with a failure according to embodiments of the present disclosure.

In some embodiments, after method 300 for storage management shown in FIG. 3 is performed, the process or method 500 shown in FIG. 5 can be utilized to replace the faulty storage devices.

At 510, in response to the first storage device being replaced by the second storage device, a portion of logical blocks are distributed to storage blocks of the second storage device.

At 520, data in storage blocks of the first storage device are replicated into storage blocks of the second storage device and the mapping between the portion of logical blocks and the second storage device coincides with the first mapping. In some embodiments, the faulty storage device (namely, the first storage device) is replaced by a new storage device (namely, the second storage device), and the new storage device has the same storage device serial number as the faulty storage device. In some embodiments, with method 300, the mapping relation between the logical storage extent and the new storage device can be determined, and the mapping relation is the same as the first mapping relation.

Only as an example, when the faulty storage device 110-2 is replaced by a new storage device, the new storage device is still represented in the storage pool as storage device 110-2. According to the above example, the logical block -2 in the logical extent -0, the logical block -3 in the logical extent -3, the logical block 4 in the logical extent -6, the logical block 0 in the logical extent -10 and the logical block -1 in the logical extent 13 will be mapped again to new storage blocks DE02-000, DE02-001, DE02-002, DE02-003, DE02-004, namely, data in the storage blocks DE05-005, DE06-005, DE07-005, DE08-005, DE09-005 will be replicated to the new storage blocks DE02-000, DE02-001, DE02-002, DE02-003 and DE02-004.

At 530, in response to data in storage extents of the first storage device being replicated into storage blocks of the second storage device, storage resources storing second mapping are released.

Figure 6:
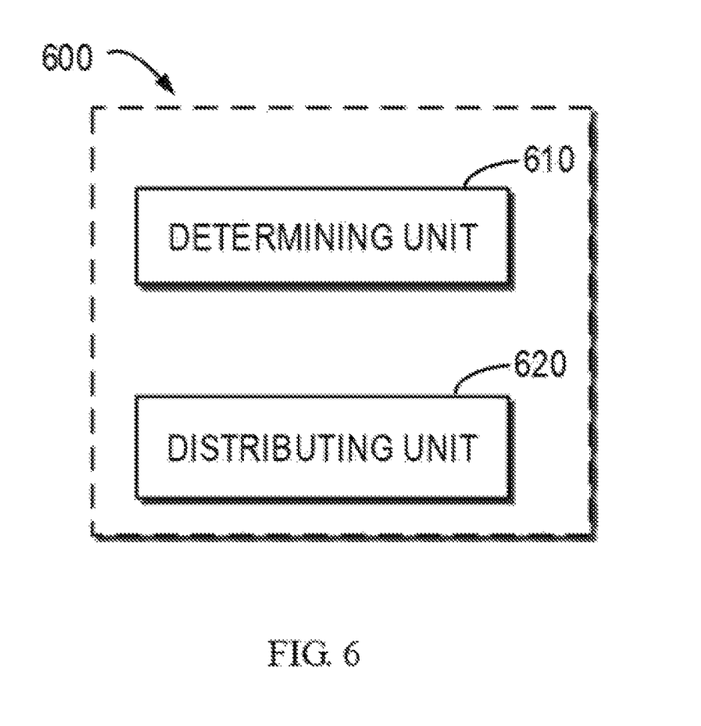
FIG. 6 is a schematic block diagram of an apparatus for storage management according to embodiments of the present disclosure.

FIG. 6 is a schematic block diagram of an apparatus 600 according to embodiments of the present disclosure. For example, the method 300, the method 400 and the method 500 shown in FIGS. 3-5 can be implemented with the apparatus 600. As illustrated, the apparatus 600 may include a determining unit 610 and a distributing unit 620. The determining unit 610 is configured to: in response to a logical storage extent being to be distributed to a plurality of storage devices in a storage pool, dynamically determine a first mapping between the logical storage extent and the plurality of storage devices. The distributing unit 620 is configured to: according to the first mapping, distribute a plurality of logical blocks in the logical storage extent to storage blocks of a plurality of storage devices.

In some embodiments, the determining unit 610 is configured to determine first mapping using a hash function.

In some embodiments, the distributing unit 620 is further configured to: distribute a plurality of logical blocks of the logical storage extent to storage blocks of the plurality of storage devices without storing the first mapping.

In some embodiments, the determining unit 610 is further configured to: in response to a failure in a one of in a plurality of storage devices, determine, from the plurality of logical blocks, a portion of a plurality of logical blocks which are distributed to storage blocks of the first storage device; determine a second mapping between the portion of logical blocks and storage blocks of a plurality of fault-free storage devices in the storage device pool, the second mapping being used for rebuilding data in the storage blocks of the first device into storage blocks of a plurality of fault-free storage devices.

In some embodiments, the apparatus 600 further includes a storage unit 630 configured to store second mapping.

In some embodiments, the distributing unit 620 is further configured to: redistribute a portion of logical blocks into storage blocks of different fault-free storage devices in the plurality of fault-free storage devices.

In some embodiments, the distributing unit 620 is further configured to: in response to the first storage device being replaced by a second storage device, distribute the portion of logical blocks into storage blocks of the second storage device.

In some embodiments, the apparatus 600 further include a replicating unit 640 configured to: replicate data in the storage blocks of the first storage device into the storage blocks of the second storage device, a mapping between the portion of logical blocks and the second storage device coinciding with the first mapping.

In some embodiments, a storage unit 630 is configured to: in response to data in the storage blocks of the first storage device being replicated to the storage blocks of the second storage device, release storage resources storing second mapping.

Figure 7:
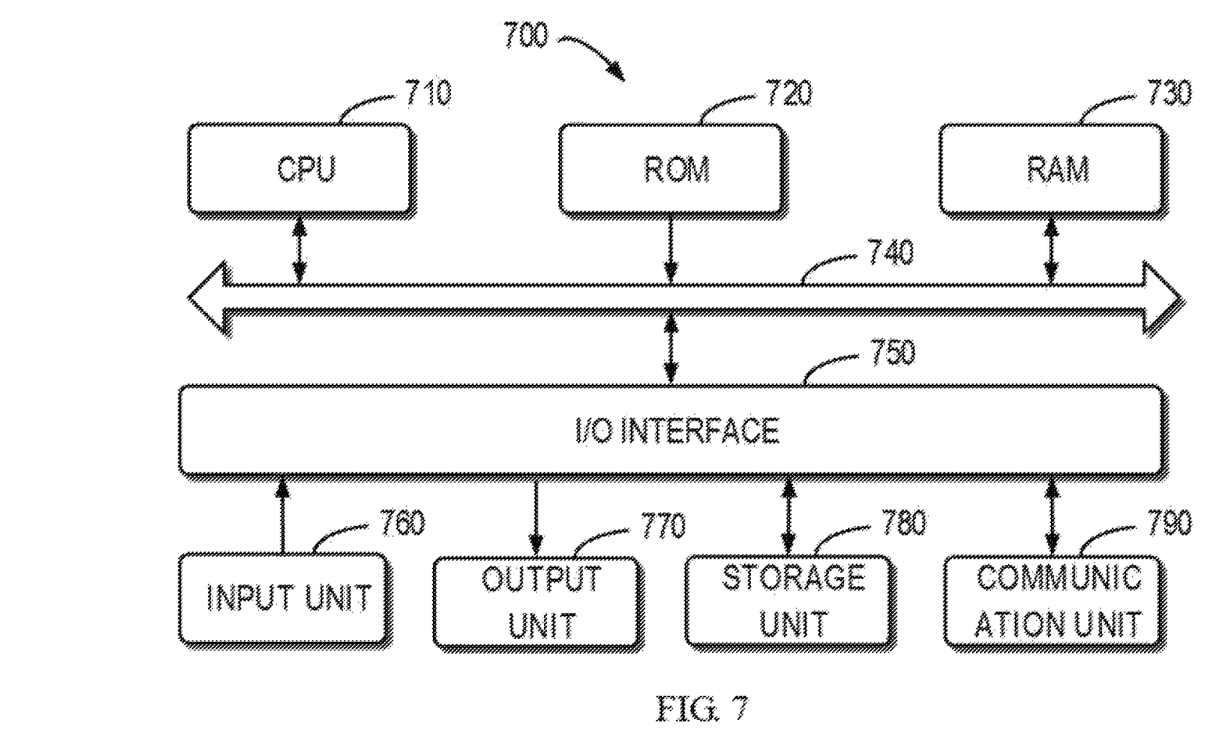
FIG. 7 is a schematic block diagram of a device for storage management according to embodiments of the present disclosure.

FIG. 7 is a schematic block diagram of an electronic device 700 applicable to implement embodiments of the present disclosure. As indicated, the device 700 includes a central processing unit (CPU) 701 which can execute various appropriate actions and processing based on the computer program instructions stored in a read-only memory (ROM) 720 or the computer program instructions loaded into a random access memory (RAM) 730 from a storage unit 780. The RAM 730 also stores all kinds of programs and data required by operating the storage device 700. CPU 710, ROM 720 and RAM 730 are connected to each other via a bus 710, to which an input/output (I/O) interface 750 is also connected.

A plurality of components in the device 700 are connected to the I/O interface 750, comprising: an input unit 760, such as keyboard, mouse and the like; an output unit 770, such as various types of displays, loudspeakers and the like; a storage unit 780, such as magnetic disk, optical disk and the like; and a communication unit 790, such as network card, modem, wireless communication transceiver and the like. The communication unit 790 allows the device 700 to exchange information/data with other devices through computer networks such as Internet and/or various telecommunication networks.

Each procedure and processing described above, such as process 300, 400 and 500, can be executed by a processing unit 710. For example, in some embodiments, the process/method 300, 400 and 500 can be implemented as computer software programs, which are tangibly included in a machine-readable medium, such as a storage unit 780. In some embodiments, the computer program can be partially or completely loaded and/or installed to the device 700 via ROM 720 and/or the communication unit 790. When the computer program is loaded to RAM 730 and executed by CPU 710, one or more steps of the above described method 300, 400 and 500 are implemented. Alternatively, in other embodiments, CPU 710 can also be configured to execute the above described process in any other suitable manner.

The present disclosure may be a method, an apparatus, a system and/or a computer program product. The computer program product can include a computer-readable storage medium loaded with computer-readable program instructions thereon for executing various aspects of the present disclosure.

The computer-readable storage medium can be a tangible device capable of holding and storing instructions used by the instruction-executing device. The computer-readable storage medium can be, but not limited to, for example electrical storage devices, magnetic storage devices, optical storage devices, electromagnetic storage devices, semiconductor storage devices or any random appropriate combinations thereof. More specific examples (non-exhaustive list) of the computer-readable storage medium comprise: portable computer disk, hard disk, random-access memory (RAM), read-only memory (ROM), erasable programmable read-only memory (EPROM or flash), static random access memory (SRAM), portable compact disk read-only memory (CD-ROM), digital versatile disk (DVD), memory stick, floppy disk, mechanical coding device, such as a punched card storing instructions or an emboss within a groove, and any random suitable combinations thereof. The computer-readable storage medium used herein is not interpreted as a transient signal itself, such as radio wave or other freely propagated electromagnetic wave, electromagnetic wave propagated through waveguide or other transmission medium (such as optical pulses passing through fiber-optic cables), or electric signals transmitted through electric wires.

The computer-readable program instructions described here can be downloaded from the computer-readable storage medium to various computing/processing devices, or to external computers or external storage devices via Internet, local area network, wide area network and/or wireless network. The network can comprise copper transmission cables, optical fiber transmission, wireless transmission, routers, firewalls, switches, gateway computers and/or edge servers. The network adapter or network interface in each computing/processing device receives computer-readable program instructions from the network, and forwards the computer-readable program instructions for storage in the computer-readable storage medium of each computing/processing device.

The computer program instructions for executing the operations of the present disclosure can be assembly instructions, instructions of instruction set architecture (ISA), machine instructions, machine-related instructions, microcodes, firmware instructions, state setting data, or a source code or target code written by any combinations of one or more programming languages comprising object-oriented programming languages, such as Smalltalk, C++ and so on, and conventional procedural programming languages, such as "C" language or similar programming languages. The computer-readable program instructions can be completely or partially executed on the user computer, or executed as an independent software package, or executed partially on the user computer and partially on the remote computer, or completely executed on the remote computer or the server. In the case where a remote computer is involved, the remote computer can be connected to the user computer by any type of networks, including local area network (LAN) or wide area network (WAN), or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit can execute computer-readable program instructions to implement various aspects of the present disclosure.

Various aspects of the present disclosure are described in reference with the flow chart and/or block diagram of the method, apparatus (system) and computer program product according to the embodiments of the present disclosure. It should be understood that each block in the flow chart and/or block diagram and any combinations of various blocks thereof can be implemented by the computer-readable program instructions.

The computer-readable program instructions can be provided to the processing unit of a general purpose computer, a dedicated computer or other programmable data processing apparatuses to generate a machine, causing the instructions, when executed by the processing unit of the computer or other programmable data processing apparatuses, to generate a device for implementing the functions/actions specified in one or more blocks of the flow chart and/or block diagram. The computer-readable program instructions can also be stored in the computer-readable storage medium. These instructions enable the computer, the programmable data processing apparatus and/or other devices to operate in a particular way, such that the computer-readable medium storing instructions can comprise a manufactured article that includes instructions for implementing various aspects of the functions/actions specified in one or more blocks of the flow chart and/or block diagram.

The computer-readable program instructions can also be loaded into computers, other programmable data processing apparatuses or other devices, so as to execute a series of operational steps on the computers, other programmable data processing apparatuses or other devices to generate a computer implemented process. Therefore, the instructions executed on the computers, other programmable data processing apparatuses or other devices can realize the functions/actions specified in one or more blocks of the flow chart and/or block diagram.

The accompanying flow chart and block diagram present possible architecture, functions and operations realized by the system, method and computer program product according to a plurality of embodiments of the present disclosure. At this point, each block in the flow chart or block diagram can represent a module, a program segment, or a portion of the instruction. The module, the program segment or the portion of the instruction includes one or more executable instructions for implementing specified logic functions. In some alternative implementations, the function indicated in the block can also occur in an order different from the one represented in the drawings. For example, two consecutive blocks actually can be executed in parallel, and sometimes they may also be executed in a reverse order depending on the involved functions. It should also be noted that each block in the block diagram and/or flow chart, and any combinations of the blocks thereof can be implemented by a dedicated hardware-based system for implementing specified functions or actions, or a combination of the dedicated hardware and the computer instructions.

Various embodiment of the present disclosure has been described above, and the above explanation is illustrative rather than exhaustive and is not limited to the disclosed embodiments. Without departing from the scope and spirit of each explained embodiment, many alterations and modifications are obvious for those ordinary skilled in the art. The selection of terms in the text aim to best explain principle, actual application or technical improvement in the market of each embodiment or make each embodiment disclosed in the text comprehensible for those ordinary skilled in the art.

We claim:
1. A method of storage management, comprising:
in response to a logical storage extent being to be distributed to a plurality of storage devices in a storage pool, dynamically determining a first mapping between the logical storage extent and the plurality of storage devices;
distributing a plurality of logical blocks of the logical storage extent to storage blocks of the plurality of storage devices based on the first mapping;
in response to a failure in a first one of the plurality of storage devices, determining, from the plurality of logical blocks, a portion of logical blocks that are distributed to storage blocks of the first storage device;
determining a second mapping between the portion of logical blocks and storage blocks of a plurality of fault-free storage devices in the storage device pool, the second mapping being used for rebuilding data in the storage blocks of the first storage device into the storage blocks of the plurality of fault-free storage devices;
storing the second mapping;
in response to the first storage device being replaced by a second storage device, distributing the portion of logical blocks to storage blocks of the second storage device;
replicating data in the storage blocks of the first storage device into the storage blocks of the second storage device, a mapping between the portion of logical blocks and the second storage device coinciding with the first mapping; and in response to data in the storage blocks of the first storage device being replicated into the storage blocks of the second storage device, releasing storage resources storing the second mapping.

2. The method of claim 1, wherein dynamically determining a first mapping between the logical storage extent and the plurality of storage devices comprises:
determining the first mapping using a hash function.

3. The method of claim 1, wherein the plurality of logical blocks of the logical storage extent are distributed to the storage blocks of the plurality of storage devices without storing the first mapping.

4. The method of claim 1, further comprising:
redistributing the portion of logical blocks to storage blocks from different fault-free storage devices in the plurality of fault-free storage devices.

5. The method of claim 1, further comprising:
storing a serial number of a next available storage device; and
updating the serial number of the next available storage device when the second mapping is determined.

6. The method of claim 5, further comprising:
wherein the second mapping is determined based at least in part on the stored serial number of the next available storage device.

7. An electronic device, comprising:
at least one processor; and
a memory coupled to the at least one processor and having instructions stored therein which, when executed by the at least one processor, cause the electronic device to perform acts comprising:
in response to a logical storage extent being to be distributed to a plurality of storage devices in a storage pool, dynamically determining a first mapping between the logical storage extent and the plurality of storage devices;
distributing a plurality of logical blocks of the logical storage extent to storage blocks of the plurality of storage devices, based on the first mapping;
in response to a failure in a first one of the plurality of storage devices, determining, from the plurality of logical blocks, a portion of logical blocks that are distributed to storage blocks of the first storage device;
determining a second mapping between the portion of logical blocks and storage blocks of a plurality of fault-free storage devices in the storage device pool, the second mapping being used for rebuilding data in the storage blocks of the first storage device into the storage blocks of the plurality of fault-free storage devices;
storing the second mapping;
in response to the first storage device being replaced by a second storage device, distributing the portion of logical blocks to storage blocks of the second storage device;
replicating data in the storage blocks of the first storage device into the storage blocks of the second storage device, a mapping between the portion of logical blocks and the second storage device coinciding with the first mapping; and
in response to data in the storage blocks of the first storage device being replicated into the storage blocks of the second storage device, releasing storage resources storing the second mapping.

8. The device of claim 7, wherein dynamically determining a first mapping between the logical storage extent and the plurality of storage devices comprises:
determining the first mapping using a hash function.

9. The device of claim 7, wherein the plurality of logical blocks of the logical storage extent are distributed to the storage blocks of the plurality of storage devices without storing the first mapping.

10. The device of claim 7, wherein the acts further comprise:
redistributing the portion of logical blocks to storage blocks from different fault-free storage devices in the plurality of fault-free storage devices.

11. The device of claim 7, wherein the acts further comprise:
storing a serial number of a next available storage device; and
updating the serial number of the next available storage device when the second mapping is determined.

12. The device of claim 11, further comprising:
wherein the second mapping is determined based at least in part on the stored serial number of the next available storage device.

13. A non-transitory computer-readable medium having instructions stored thereon which, when executed by at least one processing unit, cause the at least one processing unit to perform a method comprising:
in response to a logical storage extent being to be distributed to a plurality of storage devices in a storage pool, dynamically determining a first mapping between the logical storage extent and the plurality of storage devices;
distributing a plurality of logical blocks of the logical storage extent to storage blocks of the plurality of storage devices, based on the first mapping;
in response to a failure in a first one of the plurality of storage devices, determining, from the plurality of logical blocks, a portion of logical blocks that are distributed to storage blocks of the first storage device;
determining a second mapping between the portion of logical blocks and storage blocks of a plurality of fault-free storage devices in the storage device pool, the second mapping being used for rebuilding data in the storage blocks of the first storage device into the storage blocks of the plurality of fault-free storage devices;
storing the second mapping;
in response to the first storage device being replaced by a second storage device, distributing the portion of logical blocks to storage blocks of the second storage device;
replicating data in the storage blocks of the first storage device into the storage blocks of the second storage device, a mapping between the portion of logical blocks and the second storage device coinciding with the first mapping; and
in response to data in the storage blocks of the first storage device being replicated into the storage blocks of the second storage device, releasing storage resources storing the second mapping.

14. The medium of claim 13, wherein dynamically determining a first mapping between the logical storage extent and the plurality of storage devices comprises:
determining the first mapping using a hash function.

15. The medium of claim 13, wherein the plurality of logical blocks of the logical storage extent are distributed to the storage blocks of the plurality of storage devices without storing the first mapping.

16. The medium of claim 13, wherein the method further comprises:
   redistributing the portion of logical blocks to storage blocks from different fault-free storage devices in the plurality of fault-free storage devices.

17. The medium of claim 13, wherein the method further comprises:
   storing a serial number of a next available storage device; and
   updating the serial number of the next available storage device when the second mapping is determined.

18. The medium of claim 17, further comprising:
   wherein the second mapping is determined based at least in part on the stored serial number of the next available storage device.

* * * * *